(12) United States Patent
Lalancette et al.

(10) Patent No.: US 6,653,561 B2
(45) Date of Patent: Nov. 25, 2003

(54) OUTLET BOX AND PARTITION

(75) Inventors: Daniel Lalancette, L'Acadie (CA); Pierre Aubin, St. Jean-sur-Richelieu (CA)

(73) Assignee: Thomas & Betts International, Inc., Sparks, NV (US)

(*) Notice: Subject to any disclaimer, the term of this patent is extended or adjusted under 35 U.S.C. 154(b) by 0 days.

(21) Appl. No.: 10/238,027

(22) Filed: Sep. 9, 2002

(65) Prior Publication Data

US 2003/0056964 A1 Mar. 27, 2003

Related U.S. Application Data

(60) Provisional application No. 60/324,785, filed on Sep. 25, 2001.

(51) Int. Cl.[7] ................................................ H02G 3/08
(52) U.S. Cl. ........................... 174/50; 174/58; 174/60; 174/63; 220/3.8; 220/4.02; 439/926
(58) Field of Search ..................... 124/48, 50, 58, 124/63, 60; 220/4.02, 3.8; 439/926; 361/752

(56) References Cited

U.S. PATENT DOCUMENTS

| 1,920,811 | A |   | 8/1933  | Schwabacher |
| 1,929,844 | A |   | 10/1933 | Haas |
| 3,371,149 | A |   | 2/1968  | Maxted |
| 3,587,906 | A | * | 6/1971  | Pepe .......................... 220/3.2 |
| 4,455,449 | A |   | 6/1984  | Rendel |
| 5,486,650 | A | * | 1/1996  | Yetter ......................... 174/53 |
| 6,362,423 | B1 | * | 3/2002 | Wise et al. ................... 174/50 |
| 6,395,979 | B1 | * | 5/2002 | English ....................... 174/50 |
| 6,395,981 | B1 | * | 5/2002 | Ford et al. ................... 174/50 |

* cited by examiner

*Primary Examiner*—Dhiru R Patel
(74) *Attorney, Agent, or Firm*—Hoffmann & Baron, LLP

(57) ABSTRACT

An electrical outlet box assembly provides for the divided accommodation of various voltages of wires and termination devices. The outlet box assembly includes a box housing having a back wall, a perimetrical side wall surrounding the back wall which defines an open front face and a box interior. The back wall includes a plurality of removable ground screws threadedly attached to the back wall. A box divider is insertable into the box interior through the front face. The box divider includes a planar divider wall and a transverse mounting bracket extending from edge thereof. The transverse bracket includes an aperture for allowing mounting of the divider to the back wall of the box using one of the ground screws. The divider wall includes at least one frangible end portion for adjusting the length of the wall.

17 Claims, 5 Drawing Sheets

OUTLET BOX AND PARTITION

CROSS-REFERENCE TO RELATED APPLICATION

This application claims priority to U.S. Provisional Application No. 60/324,785 filed on Sep. 25, 2001.

FIELD OF THE INVENTION

The present invention relates generally to an outlet box having a partition therein for separating different voltage sources. More particularly, the present invention relates to a partition which is insertable into a box interior for separating the box into different voltage, circuit, or current source compartments.

BACKGROUND OF THE INVENTION

It has long been known to use electrical outlet boxes to mount various electrical termination devices such switches and receptacles therein. These outlet boxes typically include a back wall and a perimetrical side wall defining an open front face and a box interior. Electrical wires are run into the box interior through a knockout opening in the back wall or side wall and are terminated to the electrical termination devices such as switches or receptacles mounted in the box interior along the front face.

It has also been known to use electrical outlet boxes to terminate wires of different voltages, circuits or current sources. For example, an electrical outlet box may house an electrical receptacle or switch which terminates power conductors and may also house data or communication termination devices for terminating low voltage data/communication wires.

Various applicable codes such as the National Electrical Code and the Canadian Electrical Code require that where an outlet box houses wires and termination devices of different voltages, the different voltages must be housed in separate compartments. Many outlet boxes are available which provide for the compartmentalized receipt of termination devices and wires of different voltages.

The art has also seen the use of multi-gang boxes where components of the box are provided so that the box may be formed to accommodate a plurality of termination devices by ganging the boxes together. In such multi-gang situations, in order to install a divider, it is often necessary to disassemble the multi-gang box and reassemble the box with the divider in place. Furthermore, many of the dividers which are provided to separate various voltages, require additional mounting hardware and attachment locations on the box itself. This greatly increases the cost and the complexity of making such an assembly.

It is desirable therefore to provide an electrical outlet box of the multi-gang variety where a divider may be used to easily divide various voltages accommodated by the box.

SUMMARY OF THE INVENTION

An electrical outlet box is provided having a back wall, a perimetrical side wall surrounding the back wall and defining an open front face in a box interior. The back wall includes a plurality of removable ground screws threadedly attached thereto. A box divider is insertable into the box interior through the front face. The box divider includes a planar divider wall and a transverse mounting bracket extending from one edge thereof. The transverse bracket includes a screw threaded aperture for allowing mounting of the divider to the back wall using one of the ground screws.

The transverse bracket may include a boss formed by a convex protrusion extending toward the open front face. The convex protrusion provides a surface which prevents attachment of a ground wire thereto.

The planar divider walls may include frangible end portions which are detachable therefrom. The planar wall length is thereby adjustable to accommodate different box depths.

The box divider may be integrally formed of conductive metal for attachment to a metal box.

BRIEF DESCRIPTION OF THE PREFERRED EMBODIMENTS

The present invention provides an outlet box of the multi-gang variety which permits insertion of a divider into the box, which compartmentalizes the box so as to accommodate termination devices and wires of different voltages, circuits, or current sources within individual divided compartments.

Figure 1:
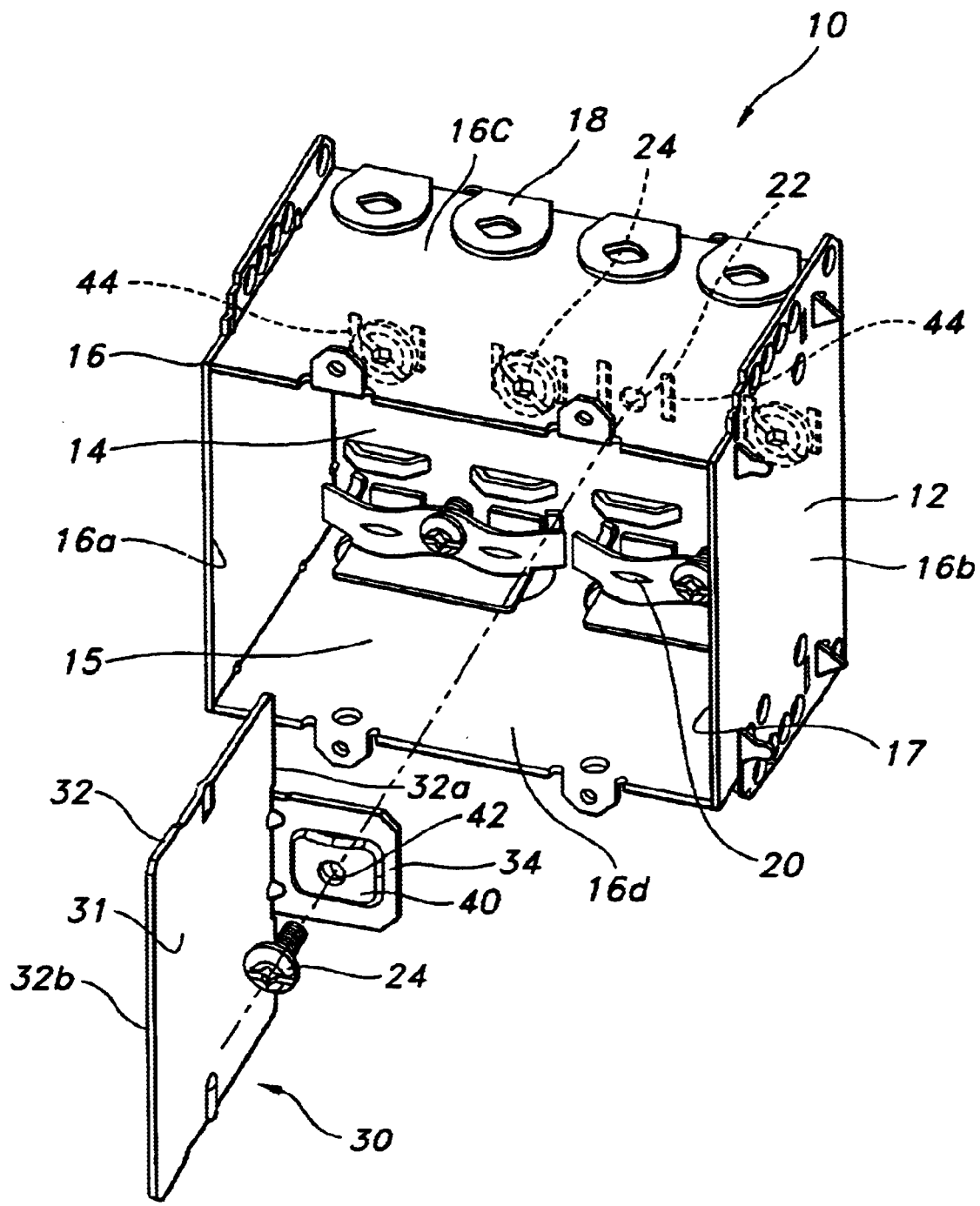
FIG. 1 is an exploded perspective view of the electrical outlet box assembly of the present invention.

Referring now to FIG. 1, an outlet box assembly 10 of the present invention is shown. Outlet box assembly 10 includes an electrical outlet box housing 12 which, as is conventionally known, is generally rectangular in shape having a planar back wall 14 and a perimetrical side wall 16 extending outwardly from and bounding back wall 14. The back wall 14 and side wall 16 define a box interior 15 and an open front face 17. The perimetrical side wall 16 may be formed of individual side wall components including opposed lateral walls 16a, 16b and top and bottom walls 16c, 16d for attachment about the back wall 14 to form outlet box housing 12. In the present illustrative embodiment, outlet box housing 12 is formed of conductive metal and of individual components. However, other materials and construction techniques may be used to manufacture outlet box housing 12.

Outlet box assembly 10 is of the type referred to as a multi-gang outlet box, in that it permits the attachment of plural components in longitudinally aligned succession, so as to accommodate various numbers of termination devices such as switches and receptacles (not shown) therein. Multiple ganged outlet boxes and assembly techniques therefor are well-known in the art and are shown in various prior art patents, such as U.S. Pat. Nos. 1,929,844 and 2,028,509.

The top and bottom walls 16c, 16d of outlet box housing 12 include a plurality of knockout openings 18 adjacent the back wall 14 which permit insertion of electrical wires and cables thereinto. Securement hardware 20 is attachable to the back wall 14 so as to provide strain relief attachment of the wires and cables inserted into the box housing. Also as conventionally known, the back wall 14 includes a plurality of internally screw-threaded apertures 22 which accommodate threaded screws 24 therein. The threaded screws 24 allow for the secure attachment of the end of a ground wire so as to effect grounding connection from the ground wire to the metal box. The back wall 14 provides for a plurality of such threaded apertures 22 so as to accommodate various combinations and locations of wires and termination devices which are housed within box housing 12. In each installation situation, one or more of the ground screws need not be used.

In certain instances, the box housing 12 accommodates electrical power termination devices such as switches and receptacles and/or combinations thereof. In these cases, the termination devices terminate electrical power wires inserted into the box. However, in certain situations, it is desirable to terminate both electrical power wires with termination devices such as switches and receptacles and low-voltage wires such as data and communications wires with data and communication receptacles such as jacks. Various applicable codes, such as the National Electrical Code and the Canadian Electrical Code, require that where a box terminates wires of different voltages therein, compartmentalized separation must be maintained therebetween.

The outlet box assembly 10 of the present invention provides a divider 30 which is insertable into the box interior 15 so as to divide the box interior into two separated compartmentalized regions. The divider 30 includes a generally rectangular plate like wall 31 also formed of metal having a perimetrical edge 32 extending therearound. Extending from a proximal edge 32a in transverse fashion is an integrally formed bracket 34.

Figure 2:
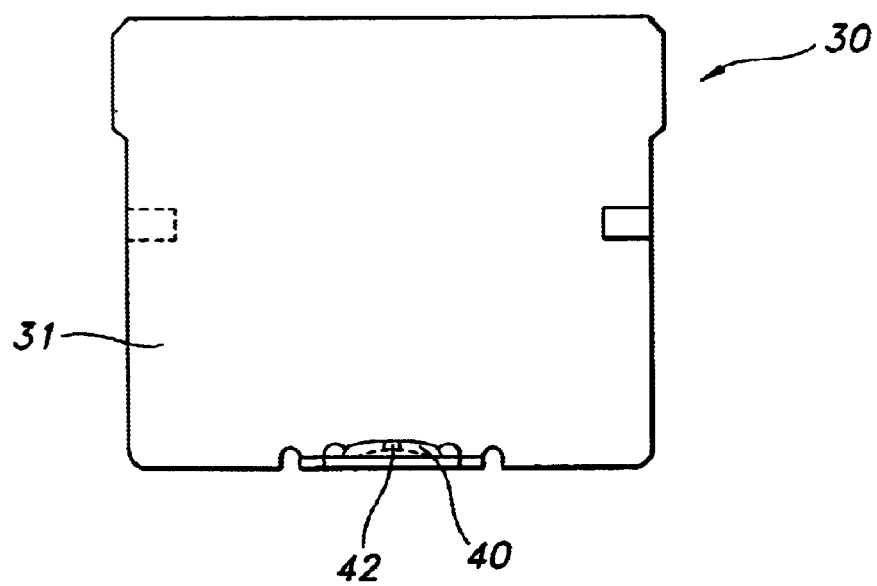
FIGS. 2–4 show respectively front, top, and side plan views of the box divider employed in the box assembly of FIG. 1.
Figures 3, 4:
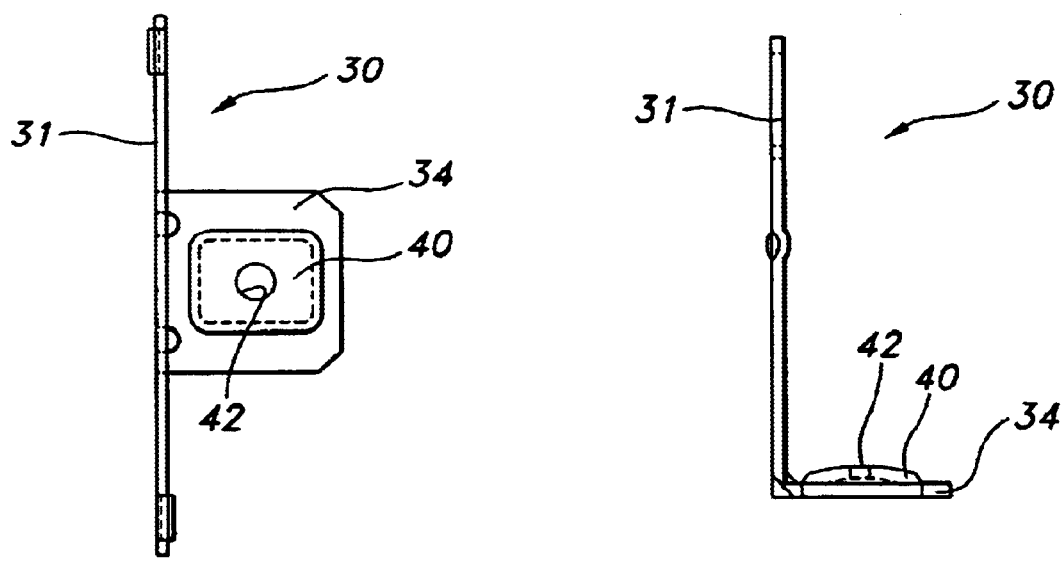
Figure 9:
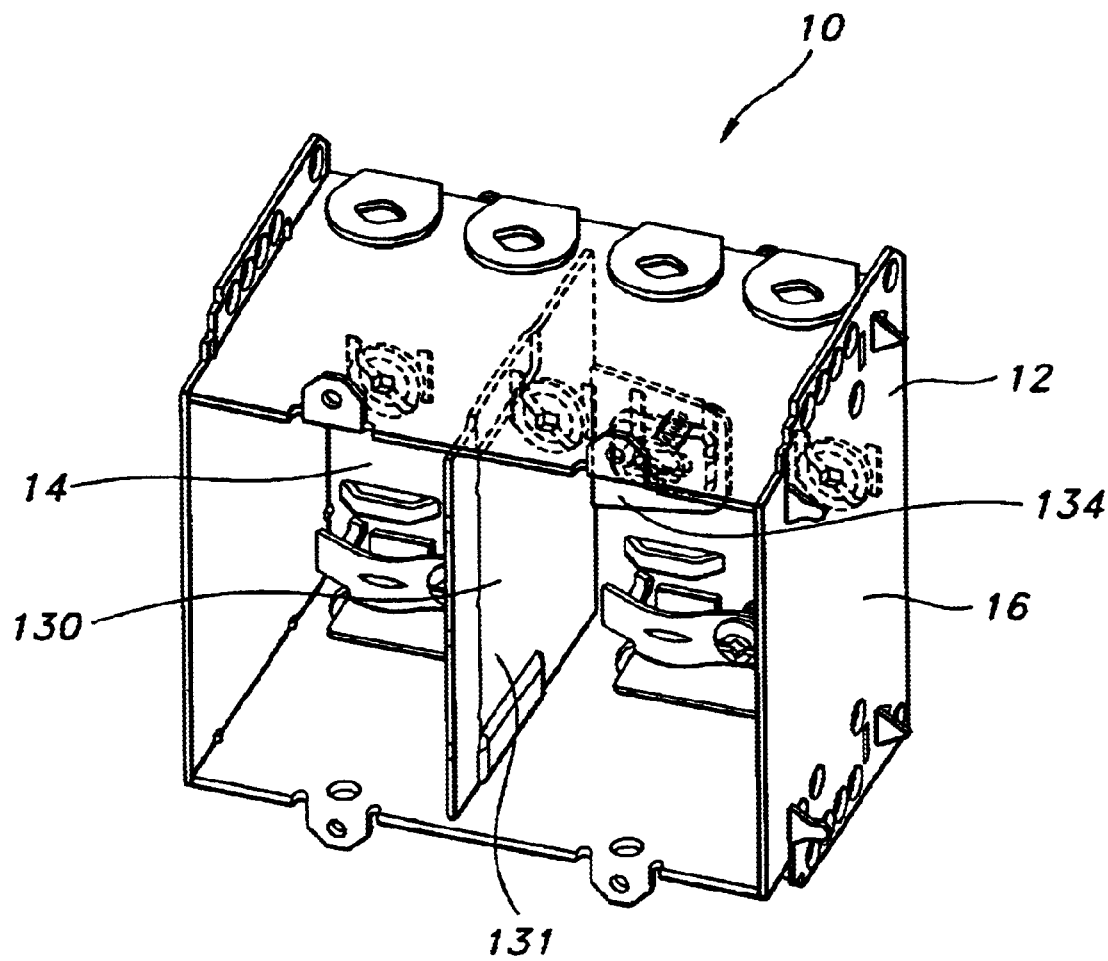
FIG. 9 is a perspective showing of the outlet box assembly of FIG. 1 including the box divider of FIGS. 5–8.

As shown additionally in FIGS. 2–4, divider 30 has generally an L-shaped configuration so that when the bracket 34 is mounted to the back wall 14 of box housing 12, the wall 31 extends towards the open front face 17 of box housing 12 parallel to lateral walls 16a and 16b. The wall 31 extends such that a distal edge 32b is approximately co-extensive with the extending side wall 16. Divider 30 divides outlet box housing 12 into two compartmentalized regions 36 and 38 separated by the divider wall 31 (FIG. 9).

Divider 30 is mounted to back wall 14 employing one of the screw threaded apertures 22 used to accommodate a ground screw 24. In that regard, bracket 34 includes a centrally raised, convex boss 40 extending towards the open front face 15 of box housing 12. Boss 40 includes an aperture 42 designed to accommodate a fastener such as the ground screw 24 insertable into threaded aperture 22 of back wall 14. The aperture 42 is of dimension sufficient to allow passage of threaded screw 24 therethrough. As the screw 24 used to mount bracket 34 to back wall 14 is for securement purposes. It is desirable not to use this screw for grounding of a ground wire. Therefore, the convex boss 40 provides a raised curved surface which prevents the easy attachment of a ground wire thereto. This prevents the screw 24, used to mount bracket 34 to back wall 14, to also be used to accommodate a ground wire.

Furthermore, as is well known in the art, the back wall 14 of box housing 12 includes a pair of retention bumps 44 on either side of each ground screw aperture 22. These retention bumps help confine the ground wire attached about the ground screw. The bracket 34 of the present invention is configured so as to cooperate with the retention bumps to positionally confine the bracket against the back wall.

It may be appreciated that as the divider 30 is insertable into the interior of box housing 12, the divider 30 may be assembled as desired in the field to provide compartmentalized combination of dual voltage wires within a multi-gauged box housing without need to disassemble the box housing.

As noted above, divider 30 is designed so that it extends from the back wall 14 of box housing 12 co-extensively with side wall 16 so that the entire box interior is compartmentalized. In use, outlet boxes have differing box depths, that is, the dimension is measured from the open front face of the box to the back wall of the box. In order to accommodate outlet boxes having differing depths and to fully compartmentalize these boxes, the present invention provides a divider which is adjustable to differing box depths.

Referring now to FIGS. 5–9, a further embodiment of the divider is shown. Divider 130 is substantially similar to divider 30 described above and includes a generally rectangular plate-like wall 131 bounded by edge 132. An integrally formed bracket 134 extends from a proximal edge 132a in transverse fashion. Bracket 134 is mounted to the back wall 14 of box housing 12 in a manner described above. In order to adjust to different box depths, the divider wall 131 includes a pair of side-by-side frangible portions 133 and 135 at a distal end thereof. Frangible portions 133 and 135 are defined by score lines 137 and 139 respectively extending along the divider wall 131. The score lines permit the frangible portions 133, 135 to be manually detached from the divider wall 131 to adjust the length of the divider 130.

Figure 5:
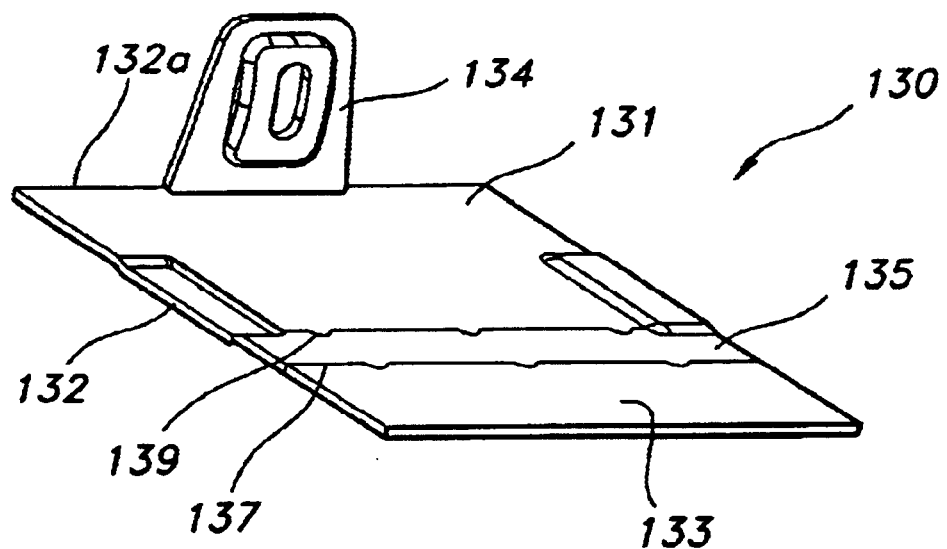
FIGS. 5–8 are perspective showings of a further preferred embodiment of the box divider employed in the box assembly of FIG. 1.
Figure 6:
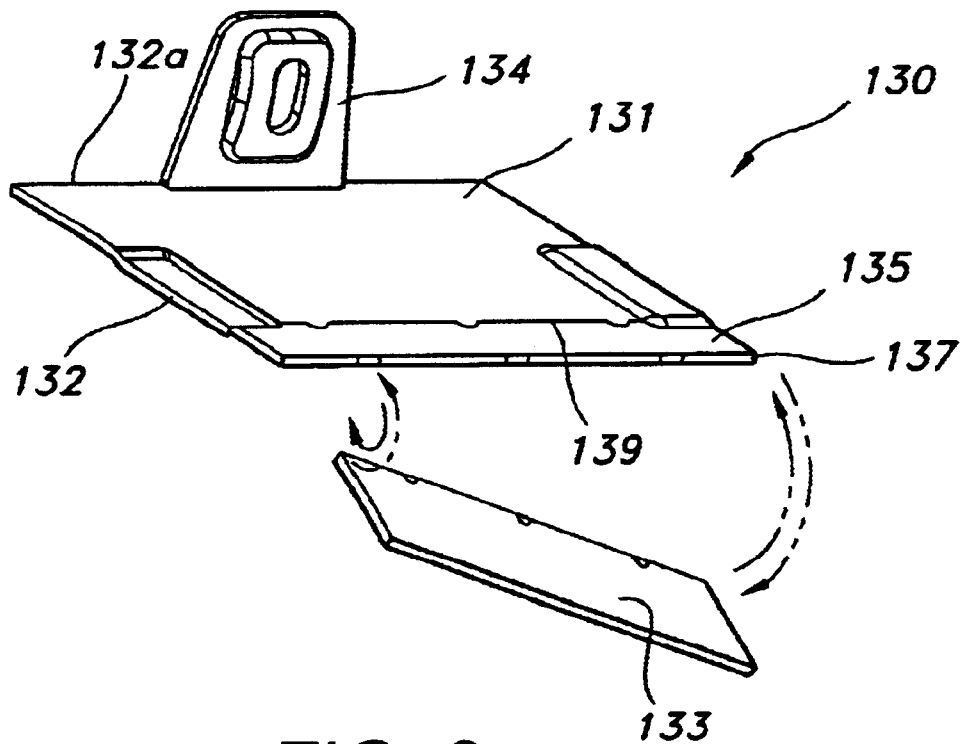
Figure 7:
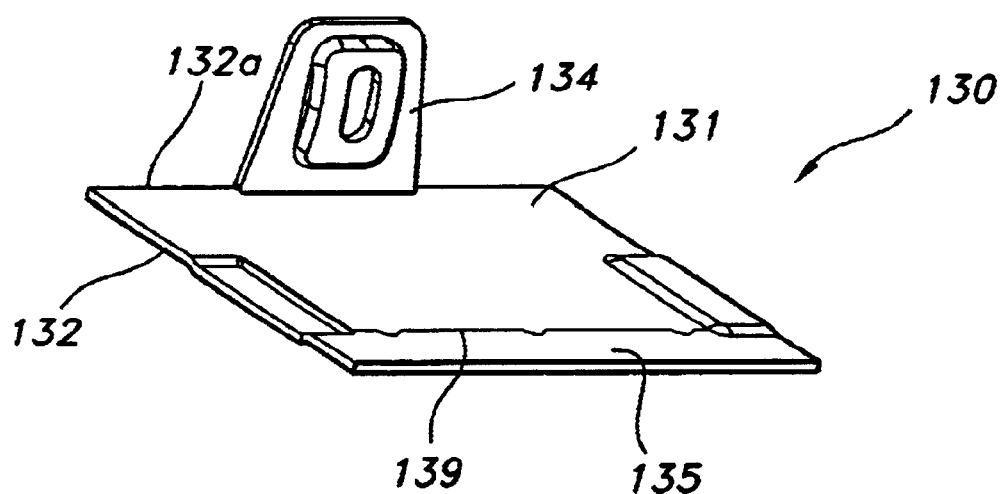
Figure 8:
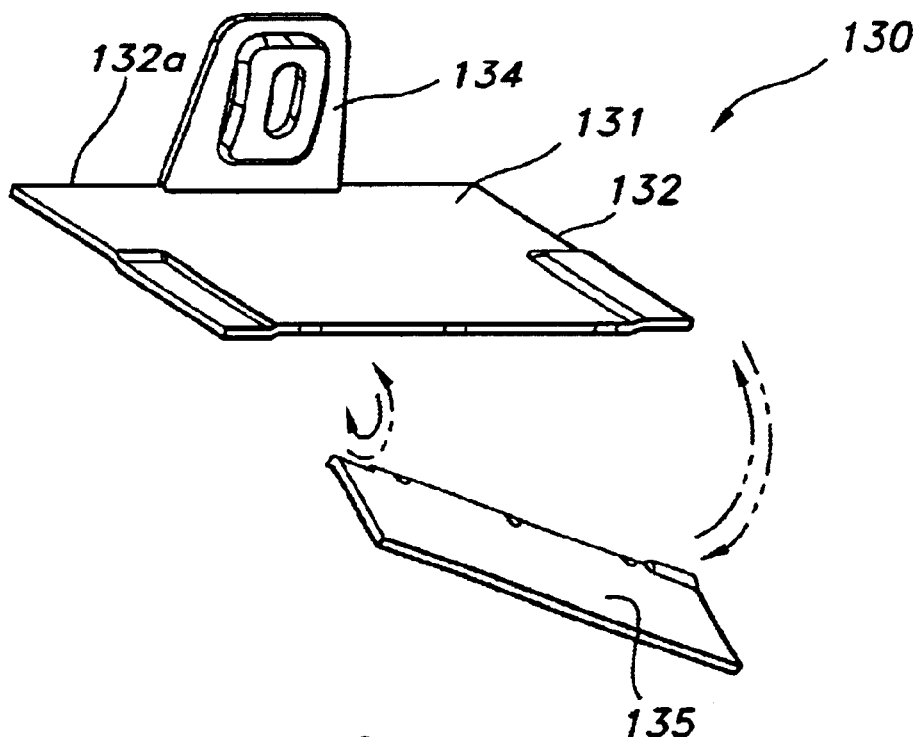

As shown in FIG. 5, the divider 130 may be used with each of the frangible portions 133, 135 remaining with the divider wall 131. This allows the divider to be used with a box having a maximum depth. As shown in FIG. 6, in order to accommodate boxes having less than this maximum depth, the distal-most frangible portion 133 may be detached from the wall 131 manually at score line 137.

It is further contemplated that in order to accommodate boxes of shallower depth, the adjacent frangible portion 135 may be manually detached from divider wall 131 along score line 139. This allows the divider 130 to be accommodated in a box of shallow depths.

While each of the frangible portions 133 and 135 are shown as being individually detached in sequence from divider wall 131, it may be appreciated that both of the frangible portions may be detached in unison from the divider wall 131 at score line 139. Thus, as shown in FIG. 9, the divider 130 can be adjusted so that the divider wall 131 extends co-extensively with side wall 16 from back wall 14 of box 12.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendment and/or deviations be included within the scope of the following claims.

What is claimed is:

1. An electrical outlet box comprising:
   a box housing having a back wall, a perimetrical side wall surrounding said back wall defining an open front face and a box interior, said back wall having a plurality of ground screw apertures in said back wall; and
   a box divider insertable into said box interior through said front face, said box divider including a planar divider wall and a transverse mounting bracket extending from one edge thereof, said transverse bracket including a bracket aperture for allowing mounting of said divider to said back wall using one of said ground screw apertures of said box back wall, wherein said transverse bracket includes a convex boss extending towards said open front face, said convex boss defining a raised curved surface which prevents attachment of a ground wire thereto.

2. An electrical outlet box of claim 1 wherein said bracket aperture is of sufficient dimension to allow passage of a threaded screw therethrough.

3. An electrical outlet box of claim 1 wherein said boss positionally aligns said divider within said box interior.

4. An electrical outlet box of claim 3 wherein said back wall of said box includes screw retention bumps, said bumps being engageable with said box to positionally align said divider within said box interior.

5. An electrical outlet box of claim 1 wherein said box divider extends from said back wall approximately co-extensively with said perimetrical side wall.

6. An electrical outlet box of claim 5 wherein said planar divider wall includes at least one frangible end portion for adjusting the length of said wall.

7. An electrical outlet box of claim 6 wherein said at least one frangible portion is defined by a score line permitting detachment of said frangible portion.

8. An electrical outlet box of claim 6 wherein said planar divider wall includes a pair of side-by-side frangible portions.

9. An electrical outlet box of claim 1 wherein said perimetrical side wall is formed of separate wall components.

10. An electrical outlet box of claim 1 wherein said box housing and said divider are formed of conductive metal.

11. A divider for insertion into an electrical outlet box comprising:

a planar divider wall having a perimetrical edge; and a bracket extending transverse from said planar divider wall along said edge, said bracket including a convex boss having a central bracket aperture for accommodating a fastener for attaching said divider to said box, wherein said convex boss defining a raised curved surface which prevents attachment of a ground wire thereto.

12. A divider of claim 11 wherein said bracket aperture is of sufficient dimension to allow passage of said fastener therethrough.

13. A divider of claim 11 wherein said planar divider wall and said bracket are integrally formed.

14. A divider of claim 11 wherein said planar divider and said bracket are formed of conductive metal.

15. A divider for insertion into an electrical outlet box comprising:

a planar divider wall having a perimetrical edge; and a bracket extending transverse from said wall along said edge, said bracket including a convex boss having a central bracket aperture for accommodating a fastener for attaching said divider to said box, wherein said planar divider wall is elongate and includes a proximal end adjacent said transverse mounting bracket and an opposed distal end, said distal end including at least one frangible portion for reducing the length of said divider wall.

16. A divider of claim 15 wherein said planar divider wall includes a pair of side-by-side frangible portions adjacent said distal end.

17. A divider of claim 15 wherein said frangible portions are defined by score lines.

* * * * *